SYNCHRONIZING PULSE CONTROL CIRCUIT

Filed Dec. 23, 1960 2 Sheets-Sheet 1

INVENTOR.
ERNEST F. ROIZ
BY Max Moody
ATTORNEY

SYNCHRONIZING PULSE CONTROL CIRCUIT

Filed Dec. 23, 1960 2 Sheets-Sheet 2

INVENTOR.
ERNEST F. ROIZ
BY [signature]
ATTORNEY

United States Patent Office 3,102,164

Patented Aug. 27, 1963

3,102,164

SYNCHRONIZING PULSE CONTROL CIRCUIT

Ernest F. Roiz, Burbank, Calif., assignor to Collins Radio Company, Cedar Rapids, Iowa, a corporation of Iowa Filed Dec. 23, 1960, Ser. No. 78,103
7 Claims. (Cl. 178—69.5)

Figure 1:
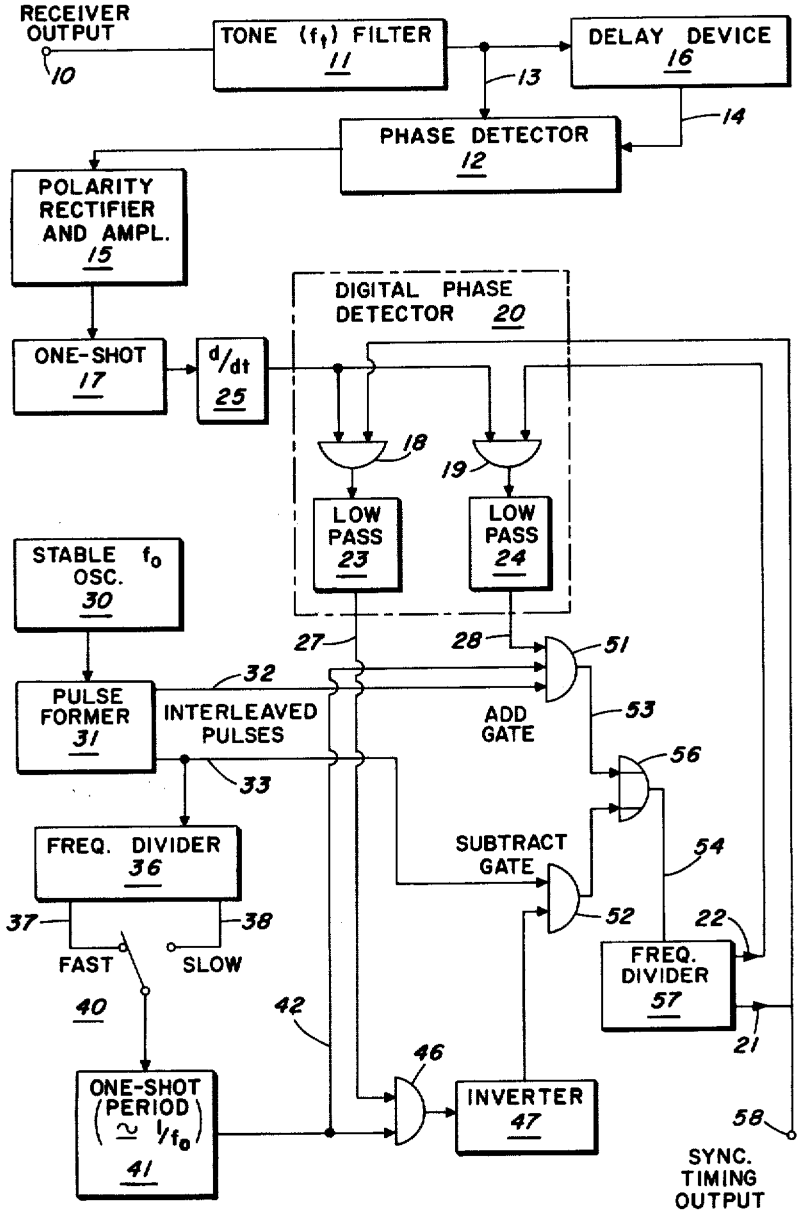

This invention relates to bit-synchronization systems for digital-data receivers.

Improved reception can be obtained by communicating digital data bit-synchronously; wherein each received bit of a signal has a modulated digital condition. In such case, it is necessary for a data receiver to be synchronized with received signal bits in order to properly detect them. This invention can be used with such data receiver to permit optimum detection of received data.

It is therefore an object of this invention to provide a bit-synchronization system which can be used with most types of synchronously transmitted digital data, such as synchronous off-on keying, synchronous frequency-shift keying, or synchronous phase-pulse modulation as described in U.S. Patent No. 2,905,812.

It is another object of this invention to provide a synchronization system in which its rate of synchronization and related overshoot can be controlled.

It is a further object of this invention to provide an output synchronization wave virtually free of jitter and having a repetition rate representing the average rate of a pulsed input, which can have significant jitter and fading.

The invention first senses boundaries between received signal-bits by detecting transitions between them. Detected transitions often are subject to much jitter, and their direct use degrades the detection process. This invention in effect cleans up their jitter and shape fluctuations. Transitions can be detected by various means (some of which are obvious) depending upon the type of received digital modulation. Thus, if a received signal is amplitude keyed, a differentiation circuit can detect its transitions by generating a pulse from each transition. On the other hand, if the signal is frequency-shift keyed, a frequency discriminator followed by a differentiation circuit can be used to detect transitions. If phase-pulse modulation is used, a circuit as described in this specification can be used. By whatever means bit transitions are detected as pulses, they are provided to a digital phase-detector, which determines whether a locally-generated wave leads or lags the transitions. The local wave is generated by a frequency divider driven by a first pulsed wave derived from a stable oscillator. A second pulsed wave at the same rate as the first is also derived from the oscillator; and the pulses of the two waves are interleaved in time. Addition and subtraction gates respectively receive the first and second pulsed waves. Outputs of the gates are commonly coupled to an input of the frequency divider. During normal synchronized conditions, the addition gate is disabled and the subtraction gate is enabled by outputs of the digital phase detector. If the local wave leads, oscillator pulses of the first wave are deleted from the input to the frequency divider by momentarily disabling the subtract gate. On the other hand, if the local wave lags, then the interleaved pulses of the second wave are momentarily passed by the "add" gate to the divider input. The rate at which pulses are added or deleted at the divider input is controlled at a chosen rate so that the rate of synchronization can be made whatever value desired.

Figure 2:
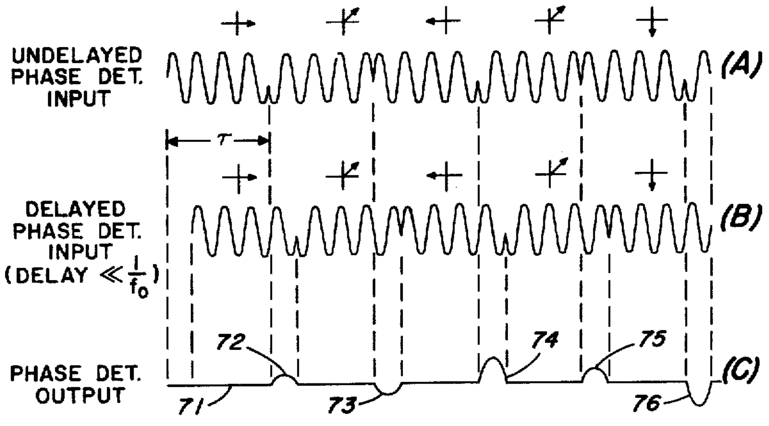
Figure 3:
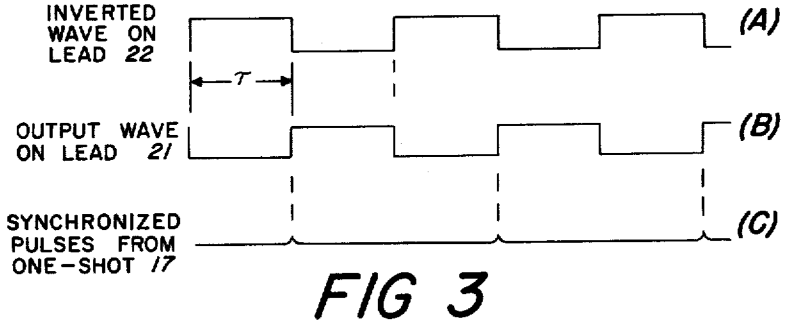
Figure 4:
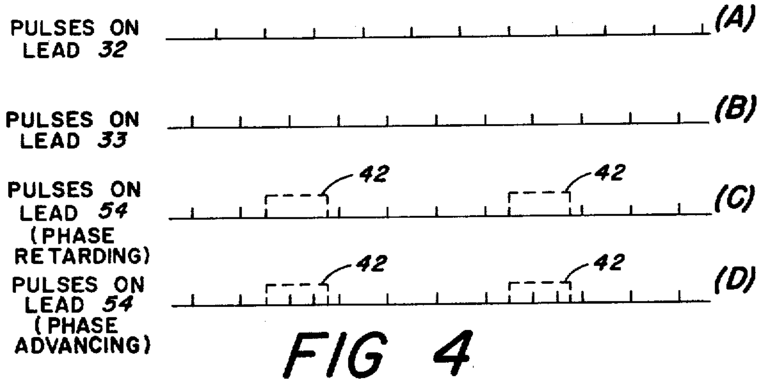

Further objects, features and advantages of this invention will become apparent to one skilled in the art upon further study of the specification and the accompanying drawings in which:

FIGURE 1 is a block representation of an embodiment of the invention; and,

FIGURES 2, 3, and 4 provide wave-forms used in explaining the operation of the embodiment in FIGURE 1.

In FIGURE 1, a terminal 10 is connected to an output of a receiver (not shown), which has the task of detecting digital data that is bit-synchronously transmitted. The received data is presumed for this embodiment to be carried by a tone as phase-pulse modulation. Phase-pulse modulation is described in U.S. Patent No. 2,905,812 titled, "High Information Capacity Phase-Pulse Multiplex System" by Melvin L. Doelz and Dean F. Babcock.

A tone filter 11 is connected to terminal 10 and filters the modulated tone $f_t$ from noise and from other tones, when transmitted in a multiplexed group. FIGURE 2(A) is illustrative of a filtered phase-pulsed tone. With a phase-pulse modulated tone, a substantially fixed phase is maintained by the tone during each signal-bit period T. At the end of each bit period, a phase-shift occurs, which is the modulation.

Accordingly, a phase transition occurs at the boundary between respective signal-bits. These boundaries are detected by a phase detector 12, which has one input directly connected to an output of tone filter 11. Another phase-detector input 14 also receives the filtered tone through a delay device 16, which may be a delay line. The delay of item 16 is nonvertical and is preferably a small fraction of a bit period, such as a few percent. FIGURE 2(B) represents the delayed tone provided at input 14.

Phase detector 12 therefore provides an output which represents the phase relationship between its inputs. Its inputs have the same continuous phase relationship when they receive the same signal bit. Therefore during the time that the same bit is being provided at both inputs, a particular D.C. level 71, shown in FIGURE 2(C), is being provided at the output of the phase detector. The D.C. reference level is dependent upon the phase-shift caused by the delay of delay device 16.

The reference D.C. level is deviated from when either input sees a phase change not presented at the other input. A phase change first occurs at input 13 upon the introduction of the next undelayed bit. The undelayed input's phase transition and new phase is then compared to the constant phase input still being provided at the delayed input. A pulse 72 results at the phase detector output, which terminates upon the next bit reaching delay input 14 to shift it to the same phase as the undelayed input. Output pulse 72 has a shape dependent primarily upon two factors, which are: (1) the modulation phase-shift that for example can be any of 45°, 135°, 225°, or 315°; and (2) the phase-shift of delay device 16. Consequently the shape, polarity, and duration of phase-detector output pulses can vary considerably. At the termination of the new undelayed bit the cycle repeats and pulses 73—76, etc. follow.

A polarity rectifier and amplifier 15 inverts negative polarity pulses, so that all pulses have the same polarity.

Since pulses at the output of the phase detector vary in shape, amplitude, and duration in an unknown manner as a function of modulation and instability of the delay line, a considerable amount of jitter is inherent in the time placement of the pulses from phase detector 12. Thus, its pulsed output is poor quality for providing synchronization in a receiver system that requires precision synchronization, such as a multiplexed phase-pulse receiver. However, this invention provides an output wave at a terminal 58 which has a stable pulse period that is the average period of a large number of periods of the jittered pulsed output from detector 12. Thus the jitter is averaged out of the output wave at terminal 58.

Furthermore, if the pulses at the output of phase detector 12 should be lost momentarily for some reason or other, such as fading, or a gap in modulation of tone $f_t$, the synchronized-output pulses at terminal 58 continue at the same rate and with a phasing representing the last averaged phasing. Accordingly, after a hiatus in detected transitions of tone $f_t$, it is not necessary to wait a long period of time during which a new averaging process occurs before the system can again become synchronized. In a multiplexed system, one tone may selectively fade out momentarily, while other tones are above minimum level. If the faded tone happens to be tone $f_t$ provided at terminal 10 for synchronization purposes, it is still essential that a synchronizing wave be maintained to detect the remaining tones; which is accomplished by this invention.

Therefore, the additional circuitry and complications provided in this invention derive a high-quality synchronization wave from a low quality wave.

A one-shot circuit 17 is connected to the output of amplifier 15 to provide pulses having a duration lasting beyond the end of any output pulse from phase detector 12; so that the one-shot cannot be retriggered by the same pulse. It is the leading edges of pulses from phase detector 12 that are most definitive of boundaries between received signal-bits; and they trigger the leading edges of the one-shot pulses. A differentiator circuit 25 connected to the one-shot output provides a pulse defining the one-shot leading-edges. Even though the output pulses of differentiator 25 have the same amplitude and duration, they still retain a timing jitter inherent in pulses provided from phase detector 12; and they can fade-out when the signal is insufficient to cause triggering of the one-shot. Therefore the output of one-shot 17 or differentiator 25 is not sufficiently stable for good-quality synchronization.

A digital phase detector 20 receives the output of differentiator 25. Digital detector 20 comprises a pair of "and" gates 18 and 19 which have an input connected to the output of differentiator 25. Each of "and" gates 18 and 19 has another input that receives an opposite-phased wave provided from outputs 21 and 22 of a frequency divider 57. One of the outputs of frequency divider 57 provides the synchronized output of the system at terminal 58.

Frequency divider 57 is driven by a stable oscillator 30 which has a frequency $f_0$. A pulse former 31 receives the output of oscillator 30 and generates the two outputs 32 and 33, wherein each has a pulse repetition rate equal to the oscillator frequency $f_0$. However, their pulses have a very short duty-cycle; and the pulses of the two waves are time interleaved with respect to each other. That is, the pulses at output 33 occur approximately mid-way between the pulses at output 32. FIGURES 4(A) and 4(B) illustrate pulses provided from outputs 32 and 33, and their relative time relationship can be seen therein.

The pulses of output 33 are provided through a normally-enabled "and" gate 52 and an "or" gate 56 to the input of frequency divider 57. The division ratio of frequency divider 57 and the oscillator frequency $f_0$ are chosen so that the frequency-divider output is equal to the bit rate of received data. Furthermore, the division ratio and frequency $f_0$ are made as high as possible; the greater the division ratio of divider 57, the greater is the accuracy of the phase adjustment of its output wave. Thus, if a division ratio of 360 is provided, a final phase adjustment can be obtained which has a phase error of not greater than $\pm 1°$.

Phase adjustment for the output wave from divider 57 is obtained by either adding or subtracting (deleting) pulses from its normally-received sequence of input pulses. Added pulses advance its output phase, and deleted pulses retard the output phase.

Digital phase detector 20 determines whether divider input pulses should be added or subtracted. Its gates 18 and 19 are enabled only during the positive-going half-cycles of respective output waves from divider 57. Thus, "and" gates 18 and 19 are enabled by different one-half cycles of the output wave at terminal 58. Consequently, differentiator 25 pulses only pass through one or the other phase-detector gate depending upon whether it is phased with the first or the second half-cycle of the output wave at terminal 58.

FIGURES 3(A) and (B) illustrate the opposite-phased output waves from divider 57. Thus, FIGURE 3(A) shows the wave on lead 22, and FIGURE 3(B) shows the wave on lead 21. FIGURE 3(C) illustrates output pulses from differentiator 25 that are synchronous with transitions of the output wave in FIGURE 3(B).

Accordingly, gate 18 passes pulses from differentiator 25 only when the frequency-divider output wave leads the differentiated pulses. On the other hand, gate 19 passes differentiator pulses only when the output wave lags those pulses. Synchronization is obtained when the differentiator pulses are positioned at a transition of the divider output wave, which is between the enablements of the gates 18 and 19.

Pulses provided from "and" gates 18 and 19 are integrated by respective low-pass filters 23 and 24, which pass the direct-current components of the pulses through respective outputs 27 and 28. Accordingly, a direct-current output is provided from filter 23 only when the frequency-divider output is leading. On the other hand, a direct-current output from low-pass filter 24 is provided only when the divider output wave is lagging.

During the synchronized conditions of the waves in FIGURES 3(A), (B) and (C), each differentiator pulse will be divided into two parts in phase detector 20, with one part being provided through gate 18 and the other part being provided through gate 19. However, direct-current components resulting from the parts will be insignificant compared to the direct-current components obtained from passage of complete differentiator pulses through one or the other of gates 18 and 19.

A pair of "and" gates 46 and 51 have their enablement controlled by low-passed outputs 28 and 27 of digital phase detector 20. The small direct-current components under synchronized conditions are not sufficient to enable gates 51 and 46, which are enabled only by substantially full direct-current outputs from the low-pass filters.

Gate 51 is hereafter referred to as "add gate 51" because it is used to add pulses at the divider input in order to advance its output phase. On the other hand, a subtract gate 52 (which is also an "and" gate) is controlled by the output of gate 46 and determines when certain of the normal input $f_0$ pulses should be deleted at the input to divider 57 to retard its output phase.

The rate at which the output wave from divider 57 is permitted to go into and to maintain synchronization is controlled by outputs of a frequency divider 36, which is also driven by output 33 of pulse former 31. Two different-rate outputs 37 and 38 from divider 36 are calibrated "fast" and "slow." Output 37, for example, might have four times the rate of output 38. Thus, output 37 might be faster than a received bit-rate, while output 38 might be slower than the bit-rate. A switch 40 selects either the "fast" or "slow" output 37 or 38. A one-shot 41 is connected to rate selector switch 40 and is triggered therefrom.

The fast rate of synchronization is primarily useful when a receiver system is first attempting synchronization to a received wave. The fast rate permits the system to quickly become synchronized from a large initial phase-error condition, which can be up to 180°. However, a fast rate of synchronization may also cause overshoot of the synchronization system output whenever small corrections are required. Consequently, the slow rate of synchronization is switched in after a short period of initial synchronization at the fast rate. The slow rate can obtain slight corrections in synchronization needed during reception of data without any substantial overshoot. Also, the slow rate permits a longer integration or averaging of the positions of the pulses from differentiator 25, which permits greater stability for the synchronization system output. The averaging function is also a function of the length of the time constants of low-pass filters 23 and 24.

The pulses provided by one-shot 41 have a duration of approximately the period of frequency $f_0$. The duration is not critical.

Both gates 46 and 51 each have an input connected to an output of one-shot 41. They also have inputs connected to respective outputs 27 and 28 of digital phase detector 20, which oppositely enable gates 46 and 51, but disable both during a synchronized condition. Hence, under nonsynchronized conditions, only one of gates 51 and 46 can pass the one-shot pulses at any given time. When gate 46 is disabled by phase detector 20, an inverter 47 provides an output that enables subtract gate 52 to pass oscillator pulses received from lead 33. Thus, during synchronized conditions, with gates 46 and 51 disabled by outputs of digital detector 20, nothing can interfere with the normal flow of oscillator pulses through gate 52 to the divider input. Then the divider output retains the same continuous output phase.

If digital phase detector 20 determines that a lagging phase exists, it provides an enabling output to "add" gate 51; which then passes oscillator pulses from lead 32 occurring during pulses from one-shot 41. Due to the much lower rate of one-shot 41 than the $f_0$ pulses, even when switch 40 is set "fast," only an occasional $f_0$ pulse is passed by gate 51 and is added through "or" gate to the normal $f_0$ pulses provided from subtract gate 52. The added pulses derived from lead 32 occur midway between pulses provided normally to the divider input from lead 33. Accordingly, there can be no coincidence occurring between the added and normal input pulses to the divider, and thus no interference problem can exist in triggering the divider.

On the other hand, if phase detector 20 determines that the phase of the local wave is leading, gate 46 is enabled; and output pulses from one-shot 41 pass through it and are inverted by inverter 47 before being provided to an input of subtract gate 52. Hence, one-shot pulses passing through gate 46 disable subtract gate 52 to interrupt its normally enabled state. Since disablement of gate 52 occurs only for the short duration of the one-shot pulses at a relatively slow rate compared to the $f_0$ rate, a one-shot pulse will only occasionally block an $f_0$ pulse recevied by gate 52. During each one-shot pulse received by gate 52, one $f_0$ pulse will be subtracted (deleted) from the normal output of gate 52, when the one-shot period is about $1/f_0$ and is properly phased with the $f_0$ pulses. The rate setting for switch 40 determines whether $f_0$ pulse subtractions occur at a slow or a fast rate, which correspondingly causes the output wave of divider 57 to be phase-shifted in a lagging direction at a slow or fast rate.

FIGURES 4(C) and (D) illustrate respectively the operation of subtract gate 52, add gate 51 and "or" gate 56. FIGURE 4(C) illustrates the output of "or" gate 56 when gate 46 is enabled by phase-detector output 27. Thus, in FIGURE 4(C) one-shot pulses 42 are imposed upon subtract gate 52 with a pulsed $f_0$ wave normally provided from lead 33; wherein each $f_0$ pulse which happens to occur within the duration of a one-shot pulse 42 is deleted by subtract gate 52 and thus does not appear in FIGURE 4(C).

On the other hand, the wave in FIGURE 4(D) illustrates the output of "or" gate 56 when "add" gate 51 is enabled by phase-detector output 28. However, before an output is provided from "add" gate 51, there must also be simultaneous enablement by a one-shot pulse, and by an $f_0$ pulse from lead 32. Hence, during an occasional one-shot pulse 42 in FIGURE 4(D), an $f_0$ pulse from lead 33 is provided from "add" gate 51 to the input of divider 57 in addition to the normal $f_0$ pulses from lead 32 being passed by subtract gate 52 to advance the divider output phase.

Although this invention has been described with respect to a particular embodiment thereof, it is not to be so limited as changes and modifications may be made therein which are within the spirit and scope of the invention as defined by the appended claims.

I claim:

1. A system for synchronizing a local wave to input pulses which can be unstable comprising, a local oscillator source having first and second interleaved pulsed output means, a subtract "and" gate connected to the first output means of said source, and an add "and" gate connected to the second output means of said source, a frequency divider, a phase detector receiving said input pulses and an output of said frequency divider, said phase detector having first and second low-pass output means, the first low-pass output means of the phase detector connected to the subtract gate to enable it under synchronized and a first condition, means for connecting said second low-pass output means of the phase detector to said "add" gate to enable it only under second conditions, a second pulse source providing pulses having a low rate compared to said oscillator source and having a duration of the order of a period of said oscillator source, and connected to said "and" gate to enable it, said second pulse source connected to said subtract gate to disable it, and means for coupling the outputs of said add and subtract gates to said frequency divider, and the frequency divider producing a synchronized local wave.

2. A system as defined in claim 1 in which said second pulse source includes plural rate signals, and switching means for selecting any particular one of said signals.

3. A system as defined in claim 1 in which said second pulse source comprises a second frequency divider connected to said oscillator source, and a one-shot connected to said second frequency divider, and the output of said one-shot being the output of said second pulse source.

4. A system as defined in claim 3 in which said means for connecting said second pulse source to said subtract gate comprises an "and" gate having inputs connected respectively to outputs of said one-shot and said phase detector, an inverter connected to said "and" gate, and said inverter connected to said subtract gate.

5. A system, as defined in claim 1 in which said phase detector comprises a pair of "and" gates, each receiving said input pulses, said frequency divider connected to said "and" gates, and low-pass filter means connected to said "and" gates.

6. A system as defined in claim 1 in which means for synchronizing said local wave with a received phase-pulsed wave comprises, a tone filter for filtering a tone of said phase-pulsed wave, a phase detecting device connected to said filter, a wave delay means being connected between the tone filter and said phase-detecting device, said delay means providing a delay less than a bit period of said phase-pulsed wave, and a pulse-shaping circuit being connected to said phase-detecting device to provide pulses for said synchronization system.

7. A system as defined in claim 6 in which said pulse-shaping circuit is a one-shot circuit.

References Cited in the file of this patent

UNITED STATES PATENTS

| | | |
|---|---|---|
| 2,843,669 | Six et al. | July 15, 1958 |
| 2,934,604 | Bizet | Apr. 26, 1960 |